United States Patent [19]

Gwilliam

[11] 3,753,498

[45] Aug. 21, 1973

[54] TUBE PRESSURE FILTERS

[75] Inventor: Ralph Derek Gwilliam, Cornwall, England

[73] Assignee: English Clays Lovering Pochin & Company Limited, Cornwall, England

[22] Filed: Aug. 2, 1971

[21] Appl. No.: 168,040

[30] Foreign Application Priority Data
Aug. 7, 1970   Great Britain.................. 38,287/70

[52] U.S. Cl................................. 210/350, 100/112
[51] Int. Cl............................................ B01d 29/38
[58] Field of Search.................... 210/232, 350, 351, 210/447, 108, 112; 100/115, 211

[56] References Cited
UNITED STATES PATENTS
3,529,726   9/1970   Keenan........................... 210/447 X FOREIGN PATENTS OR APPLICATIONS
244,142   12/1962   Australia............................. 210/351

OTHER PUBLICATIONS
Modern Plastics Encyclopedia, 1968, p. 4b, Sept. 1967.

Plastic Properties Chart, p. 30 et al., McGraw-Hill, 330 W. 42nd St. N.Y., N.Y.

*Primary Examiner*—Samih N. Zaharna
*Assistant Examiner*—T. A. Granger
*Attorney*—Larson, Taylor & Hinds

[57] ABSTRACT

The invention relates to tube pressure filters which include a pair of generally coaxial inner and outer tubular bodies arranged one within the other and adapted to be supported in a generally upright position, the inner tubular body comprising a central cylindrical section and upper and lower end sections, each of which end sections includes (i) a radially outwardly extending flange portion and (ii) a fairing mounted on or adjacent to said flange portion so as to extend around an end of said cylindrical section and an end of a filter element disposed around and supported by the inner tubular body. The fairing for the lower end section of the inner tubular body is constructed so that at least the vertex of the fairing is formed from a resilient plastics material whereby discharge of filter cake from the tube pressure filter is facilitated. The fairing for the lower end section of the inner tubular body is also preferably provided with a concavely curved profile.

9 Claims, 3 Drawing Figures

TUBE PRESSURE FILTERS

BACKGROUND OF THE INVENTION

This invention relates to apparatus for reducing the liquid content of wet, particulate solid materials.

It has been well known for many years to reduce the liquid content of wet, particulate solid materials for example in the form of a slurry, by means of plate filter presses. When treating slurries of solid materials such as clays, chalks and satin white which contain a relatively high percentage, say more than 20 percent, of particles smaller than 20 microns, it is necessary to employ high pressures to produce a filter cake of low moisutre content. However, serious engineering problems arise with conventional plate filter presses when it is desired to operate at very high pressures, for example in excess of 1,000 pounds per square inch (p.s.i.). Consequently, in recent years there have been developed tube pressure filters which are capable of operating at such high pressures. Various kinds of tube pressure filter have been described; see, for example U.K. Patent Specifications Nos 907,485 and 1,240,465.

One kind of tube pressure filter essentially comprises a pair of generally coaxial inner and outer tubular bodies arranged one within the other and adapted to be supported in a generally upright position; an impermeable elastic sleeve disposed within and secured to the outer tubular body; a filter element disposed around and supported by the inner tubular body; and means for displacing the tubular bodies axially relative to one another between a first position and a second position; wherein the arrangement is such that in the first position of said tubular bodies they co-operate with each other to define a closed chamber of annular corss-section which is divided into generally coaxial and non-intercommunicating inner and outer compartments by said impermeable elastic sleeve, the inner compartment including an inlet for a wet particulate solid material to be pressure filtered and the outer compartment including an inlet for a hydraulic fluid under pressure, and in the second position of said tubular bodies said chamber is opened to enable particulate solid material to be discharged from the inner compartment; and wherein the inner tubular body comprises a central cylindrical section, around which there is disposed the filter element, and upper and lower end sections, each of which end sections includes a radially outwardly extending flange portion which co-operates with the adjacent portion of the outer tubular body to close the chamber when said tubular bodies are in their first position, and a fairing mounted on or adjacent to said flange portion so as to extend around said central cylindrical section and an end of the filter element. The inner tubular body and the filter element are constructed and arranged so that in use, when the tubular bodies are in their first position, liquid can flow through the filter element and through apertures in the inner tubular body while solid material is retained on the filter element, the liquid being caused to flow through the filter element by the introduction of a hydraulic fluid under pressure into the outer compartment which hydraulic fluid urges the impermeable elastic sleeve towards the filter element so as to compress wet particulate solid material in the inner compartment and express liquid therefrom, and when the tubular bodies are in their second position, the chamber of annular cross-section is opened and the solid material can be discharged from the inner compartment. The inner tubular body of tube pressure filters of the kind described above which have been manufactured heretofore have been provided with fairings which have been made of a metal, generally a bronze, which provides a rigid surface, the face of the fariing being inclined towards the central cylindrical section at an angle of about 45° with the vertical. It has now been found that when some materials are pressure filtered, there is a tendency for the filter cake to adhere to the face of the lower fairing thereby rendering more difficult the discharge of the filter cake. Furthermore, with the metal fairings employed heretofore, it has been necessary to provide a ledge at the vertex of the fairing since otherwise the metal fairing tends to cut into the filter element. Such a ledge also tends to hinder the discharge of the filter cake.

It is an object of the present invention to provide a tube pressure filter of the kind described above wherein there is a reduced tendency for the filter cake, which is formed as a result of the compression of the wet particulate solid material, to adhere to the lower fairing.

SUMMARY OF THE INVENTION

Accordingly, the present invention provides a tube pressure filter which comprises (a) a pair of generally co-axial inner and outer tubular bodies arranged one within the other and adapted to be supported in a generally upright position, (b) an impermeable elastic sleeve disposed within and secured to the outer tubular body, (c) a filter element disposed around and supported by the inner tubular body, and (d) means for displacing the tubular bodies axially relative to one another between first and second positions; wherein the inner tubular body comprises a central cylindrical section and upper and lower end sections, each of which end sections includes (i) a radially outwardly extending flange portion and (ii) a fairing mounted on or adjacent to said flange portion so as to extend around said central cylindrical section and an end of said filter element, the end sections of the inner tubular body being adapted to co-operate with adjacent portions of the outer tubular body when said tubular bodies are in their first position to define a closed chamber of annular cross-section which is divided into generally co-axial inner and outer non-intercommunicating compartments by the impermeable elastic sleeve, the inner compartment having an inlet for a wet, particulate solid material and the outer compartment having an inlet for a hydraulic fluid under pressure; wherein in the second position of said tubular bodies said chamber is opened to enable particulate solid material to be discharged from the inner compartment; and wherein at least the vertex of the fairing of the lower end section of the inner tubular body is formed from a resilient plastics material.

It has now been found advantageous to construct at least the vertex of the fairing of the lower end section of the inner tubular body from a resilient plastics material, for example from a nylon, a glass-filled polyethylene, a glass-filled polypropylene, a poly(acrylonitrile-butadiene-styrene), an impact-resistant polystyrene, a rigid poly(vinyl chloride), or a polyacetal; this has been found to assist in preventing filter cake from being held by the fairing and thereby failing to discharge. It also enables the vertex of the fairing to be tapered to a sharp edge so as to provide a minimum width of material on which filter cake may be retained by the fairing. By employing a resilient plastics material for at least the vertex of the fairing of the lower end section of the inner tubular body it has been found possible to dispense with the ledge because the inherent flexibility of the resilient plastics material reduces the risk of damage being caused to the filter element.

The resilient plastics material, from which a part or the whole of the fairing of the lower end section of the inner tubular body is made, preferably has the following properties: an apparant creep modulus of at least $2.0 \times 10^5$ lbs/in$^2$ ($1.4 \times 10^9$Nm$^{-2}$) at 73°F under an initial applied stress of 2,000 lbs/in$^2$ ($1.379 \times 10^7$Nm$^{-2}$) and after a test time of 100 hrs; a tangent modulus of elasticity (as measured by the procedure specified in ASTM D 790–66) of at least $1.2 \times 10^5$ lbs/in$^2$ ($8.3 \times 10^8$Nm$^{-2}$) and an impact strength (as measured by the one-half in.× one-half in. notched bar Izod test — ASTM D 256–56) of at least 1.0 ft. lb/in (0.05 J/mm).

It has also now been found that in some cases it may be advantageous to employ at the lower end section a fairing in which the inclination of the face of the fairing with respect to the filter element varies over the length of the fairing so that the angle of inclination of the face with respect to the filter element is smallest at the vertex of the fairing. For example, the fairing can comprise two sections of linear profile connected by a concavely curved section; in such a case the angle of inclination with respect to the filter element of the lower linear section is preferably in the range of from 30° to 45°, and that the upper theupper linear section which includes the vertex of the fairing is preferably in the range of from 5° to 20°. If the fairing has an outer surface of uniform linear profile, the angle of inclination with respect to the filter element of the outer surface is preferably in the range of from 10° to 45°.

DESCRIPTION OF THE PREFERRED EMBODIMENTS

The tube pressure filters of the present invention are preferably constructed and arranged generally as described in U.K. Patent Specification No. 1,240,465. Thus, the inlet to the inner compartment is preferably adapted to deliver a wet particulate solid material to be pressure filtered to the bottom of said inner compartment and to distribute it substantially uniformly around the inner tubular body when the tubular bodies are supported in a generally upright position and in their first position. For example, the inlet of the inner compartment can advantageously comprise a plurality of apertures or ducts disposed around the lower end section of the inner tubular body in or adjacent to the fairing, whereby the wet particulate solid material to be pressure filtered can be delivered to the bottom of said inner compartment and distributed substantially uniformly around the inner tubular body. This construction and arrangement of the tube pressure filter is particularly well suited for use in reducing the liquid content of wet particulate solid materials such as clays, chalk whiting and satin white comprising 20 percent or more by weight of particles smaller than 20 microns; but the tube pressure filters of the invention can, of course, be used for reducing the liquid content of other wet particulate solids. It is also advantageous, as described in U.K. Patent Specification No. 1,240,465, for the inner tubular body to comprise a central cylindrical section and upper and lower end sections, each of which end sections includes a cap which is of a larger external diameter than said central cylindrical section and which closes the inner tubular body whereby the introduction of, for example, compressed air into the interior of the inner tubular body will bring about or facilitate the discharge of filter cake from the inner compartment when the tubular bodies are in their second position. With this arrangement, the fairings are mounted on or adjacent to said caps (the rims of which constitute radially outwardly extending flange portions) so as to extend around said central cylindrical section and the ends of the filter element.

In order to ensure that the chamber of annular cross-section is closed when the tubular bodies are in their first position a ring-seal, preferably an O-ring seal, can be mounted in the end portions of one or both of the tublar bodies, preferably the inner tubular body, so as to co-operate with a surface of adjacent end portions of the other tubular body, the ring seal being made from an elastic or plastic material so as to reduce to zero the gap between the ring seal and the surface co-operating therewith. Instead of an O-ring seal there can be used, for example, a U-ring seal or a cup-ring seal. It is possible to eliminate the ring seal as long as the inner and outer tubular bodies are provided with adjacent end portions which are a close fit.

When used for treating particulate solid materials comprising 20 percent or more by weight of particles smaller than 20 microns, the outer tubular body preferably comprises a cylindrical central section having an internal diameter not greater than 12 inches or less than 4 inches and the inner tubular body preferably comprises a cylindrical central section having an external diameter which differs from the internal diameter of the cylindrical central section of the outer tubular body by from 2 inches to 7 inches. More particularly, when the internal diameter of the cylindrical central section of the outer tubular body is 12 inches, the external diameter of the cylindrical central section of the inner tubular body preferably lies in the range 5 to 8 inches; and when the internal diameter of the cylindrical central section of the outer tubular body is 4 inches, the external diameter of the cylindrical central section of the inner tubular body lies in the range 0.8 to 2 inches. Again, when treating materials comprising 20 percent or more by weight of particles smaller than 20 microns the inlet of the inner compartment is connected to means for introducing the wet, particulate solid material to be pressure filtered under pressure, generally at least 25 p.s.i.g., into the inner compartment in a manner such that said wet particulate solid material is charged to the bottom of said inner compartment and distributed substantially uniformly around the inner tubular body so as to scour the fairing and that part of the filter element supported by the lower portion of the inner tubular body.

It is advantageous for the impermeable elastic sleeve to be secured to the lower end of the outer tubular body at a position adjacent the radially outwardly extending flange portion at the lower end section of the inner tubular body so that when hydraulic fluid is introduced into the outer compartment the elastic sleeve is urged towards the fairing mounted on or adjacent to the lower radially outwardly extending flange portion.

The filter element disposed around and supported by the inner tubular body will advantageously comprise a filter cloth which is formed from a thermoplastic continuous filament man-made polymeric material which has been heat set, e.g. by hot calendering; such a material can have a pore size sufficiently small to prevent the particulate solid material from passing therethrough, and the use of a continuous filament material gives the filter cloth good release properties. The thermoplastic continuous filament man-made polymeric material can be, for example, polyethylene terephthalate or a nylon. The filter cloth can also be formed from a material, such as a synthetic needle cloth, a heavy weight cotton cloth or a felted woollen cloth, which has been subjected to gentel singeing to remove projecting fibres and thus improve the release properties of the filter cloth. In some embodiments of the invention, it may be advantageous to render the lower part of the filter cloth impermeable. It may also be advantageous to support th filter cloth on a coarse weave backing cloth or on a wire mesh which extends in the manner of a sleeve over the inner tubular body and which is optionally covered with a coarse weave backing cloth.

The operation of the tube pressure filter of the present invention is preferably carried out in the manner described in U.K. Patent Specification No. 1,240,466, the process described therein comprising the steps of (i) supporting the tube pressure filter in an upright position with the tubular bodies in their first position (ii) introducing the wet particulate solid material under pressure into the inner compartment of the tube pressure filter whilst introducing into the outer compartment of said tube pressure filter a hydraulic fluid having a specific gravity which differs by not more than 0.05 units from that of said wet particulate solid material, the wet particulate solid material being introduced into said inner compartment in a manner such that it is charged to the bottom of said inner compartment and is distributed substantially uniformly around the inner tubular body and scours that part of the filter element supported by the lower portion of the inner tubular body, (iii) raising said hydraulic fluid to a high pressure and maintaining said hydralic fluid at said high pressure for a time sufficient to effect a reduction in the liquid content of the wet particulate solid material, (iv) withdrawing from the outer compartment the hydraluic fluid, (v) thereafter displacing the tubular bodies of the tube pressure filter axially relative to one another to their second position, and (vi) removing the particulate solid material from the surface of the filter element.

After a pressure filtering operation the particulate solid material forms a filter cake which can be removed from the filter element by known means. For example, if the inner tubular body is closed by caps one or more air blasts can be delivered to the interior of the inner tubular body and to the downstream side of the filter element. With such a system, during the operation of the pressure filter the amount of material treated is preferably selected so that the thickness of the filter cake formed on the filter element is not so thin that it flexes and does not break or so thick that a long operating cycle is required with a consequential reduction in the throughput of the apparatus. For example, with very finely divided solids such as clays, chalks and satin white the filter cake thickness should be not less than 0.2 inches to ensure that it is broken by the air blasts and does not flex, and generally not more than 0.3 inches to obtain maximum throughput since it is found that a thicker cake requires a disproportionately longer operation cycle. Preferably, the filter cake is removed from the filter element by a number of short, discrete air blasts, rather than by one long blast, since the repeated increase and decrease in the diameter of the filter element coupled with the air pressure is more effective than the air pressure alone in releasing the filter cake.

For a better understanding of the invention, and to show how the same can be carried into effect, reference will now be made, by way of example, to the accompanying drawings in which.

Figure 1:
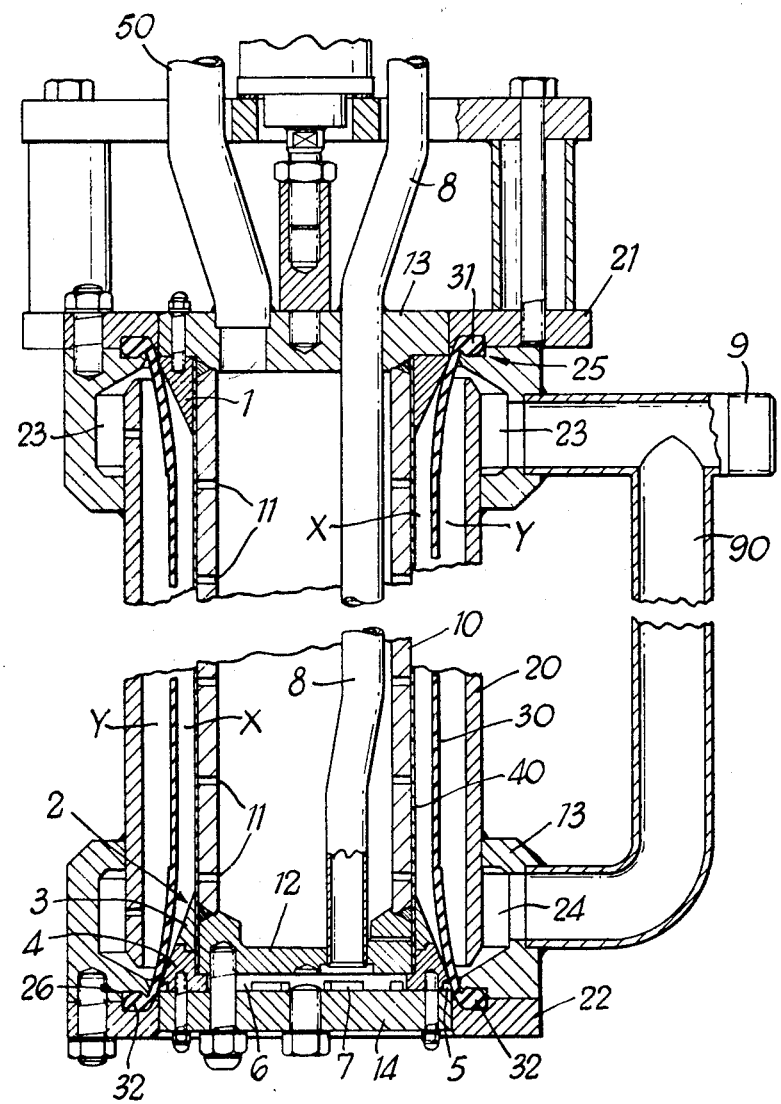
FIG. 1 is a cross-section taken through the vertical axis of one embodiment of a tube pressure filter of the present invention.

Referring first to FIG. 1, there is shown a tube pressure filter which includes an outer tubular body and an inner tubular body arranged co-axially one within the other and adapted to be supported in generally upright position. The outer tubular body comprises a central cylindrical section 20, end-sections 21 and 22, and annular galleries 23 and 24. The end-section 21 and the annular gallery 23, and the end-section 22 and the annular gallery 24, are constructed and arranged so that, when the tube pressure filter is ready for use, they provide respective recesses 25 and 26 in which are located respectively, annular beadings 31 and 32 constituting the ends of an impermeable elastic sleeve 30. A conduit 9 is provided for the supply of hydraulic fluid to the tube pressure filter; this conduit is connected to a further conduit 90 which connects the upper annular gallery 23 to the lower annular gallery 24.

The inner tubular body comprises a central cylindrical section 10, which is formed with a number of apertures such as those indicatd at 11, and upper and lower end sections. The upper end section comprises a cap 13 which has a radially outwardly extending flange portion on which is mounted a fairing 1. The lower end section comprises an inner cap 12 and an outer cap 14 which has a radially outwardly extending flange portion on which is mounted a fairing 2. The central cylindrical section 10 supports a filter element 40. The lower fairing 2 consists of a lower section 4 which is made from a bronze, and rigidly secured thereon an upper section 3 which is made from a nylon-6 designed for injection moulding and having an apparent creep modulus of $2.63 \times 10^5$ lbf/in$^2$ ($1.81 \times 10^9$ Nm$^{-2}$) when measured at 73°F under an initial applied stress of 2,000 lbf/in$^2$ ($1.379 \times 10^7$ Nm$^{-2}$) after a test time of 100 hours; a flexural modulus, i.e. tangent modulus of elasticity, of $3.8 \times 10^5$ lbf/in$^2$ ($2.6 \times 10^9$ Nm$^{-2}$); and an impact strength of 3.1 ft.lb/in. of notch (0.17H/mm) as measured by the one-half in. × one-half in. notched bar Izod impact test. The lower edge of the bronze section 4 of the fairing 2 is castellated. The vertex of the fairing 2 tapers to a sharp edge. The angle between the vertex of each of the fairings and the inner tubular body is 25°.

A compressed air line 50 extends into the interior of the inner tubular body.

The impermeable elastic sleeve 30 is secured in liquid-tight manner to the outer tubular body through the agency of its annular beadings 31 and 32 which are located in the recesses 25 and 26. The sleeve 30 divides the chamber of the tube pressure filter into non-intercommunicating inner and outer compartments X and Y.

A wet particulate solid material to be pressure filtered is introduced under pressure into inner compartment X through a plurality of slots 7 formed in the castellated lower edge of the fairing 2. The slots 7 communicate with a groove 5 and with a chamber 6 to which chamber the material to be pressure filtered is fed via a tube 8.

A siphon tube (not shown) extends into the interior of the inner tubular body through upper cap 13 and, in use, removes the filtrate from the interior of the inner tubular body.

In operation of the tube pressure filter a material to be pressure filtered is introduced into the compartment X via tube 8, chamber 6, slots 7 and groove 5, and a hydraulic fluid is introduced into the compartment Y through conduits 9 and 90. The pressure exerted by the hydraulic fluid causes the impermeable elastic sleeve 30 to compress the material being pressure filtered against the filter element 40 so as to express filtrate through the filter element and through the apertures 11 into the interior of the inner tubular body. The siphon tube then removes filtrate from the inner tubular body and the hydraulic fluid is evacuated from compartment Y. Thereafter the inner and outer tubular bodies are dsiplaced axially relative to one another to their second position so that filter cake which is supported on the filter element can be discharged from the inner compartment.

By using a fairing 2 provided with a nylon portion 3, whereby the vertex of the fairing can be tapered to a sharp edge, discharge of the filter cake is facilitated since the nylon portion can flex so that there is very little tendency for the filter cake to adhere to the nylon; furthermore the sharp vertex of the fairing offers little or no resistance to the downward passage of filter cake. Thus the possibility of the filter cake adhering to or being held by the fairing 2 and thereby failing to be discharged from the inner compartment X is reduced. The sharp vertex of the nylon portion of the fairing 2 does not cut into the filter element because the nylon is sufficiently flexible to allow the fairing to yield slightly when, for example, blasts of compressed air are applied to the inside of the inner tubular member via the compressed air line 50. It is also possible that the coefficient of friction between filter cake and the nylon is less than that between filter cake and a metal, and it is believed that water is absorbed to some extent by the nylon thereby rendering the fairing self-lubricating.

Figure 2:
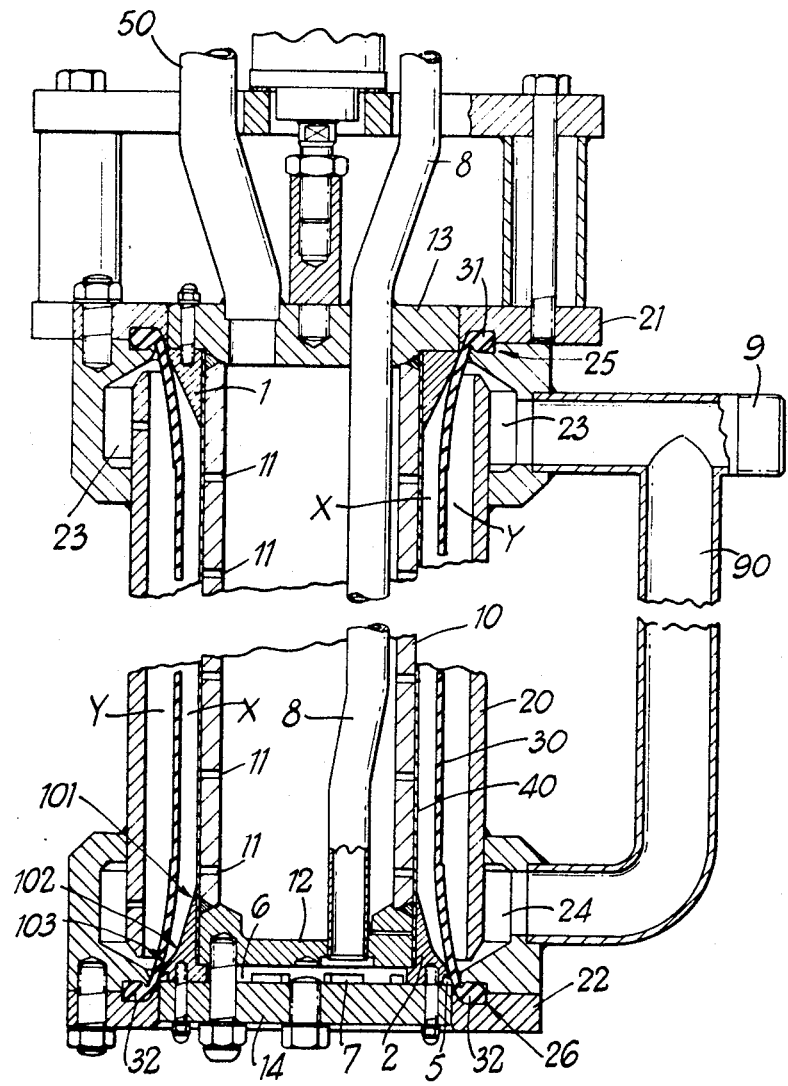
FIG. 2 is a cross-section taken through the vertical axis of a second embodiment of a tube pressure filter of the present invention.
Figure 3:
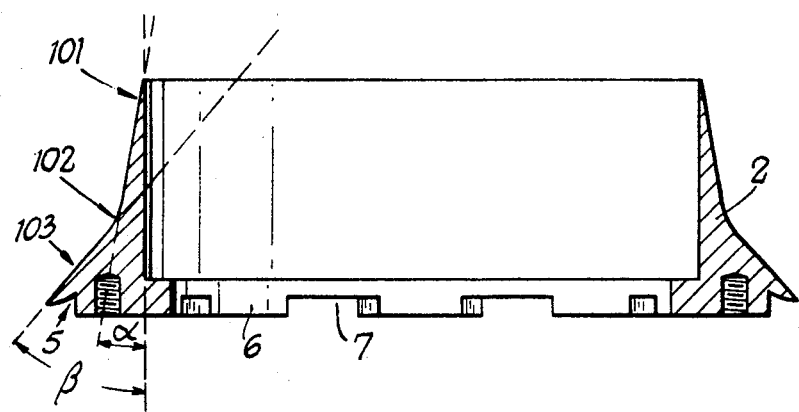
FIG. 3 is a cross-section of part of the tube pressure filter shown in FIG. 2.

Referring next to FIGS. 2 and 3 there is shown a tube pressure filter which is constructed generally as described above with reference to FIG. 1. In this embodiment, however, the lower fairing 2 comprises two linear portions, 101 and 103, of different slope and a concavely curved portion 102 which connects the two linear portions. The linear portion 101 makes an angle $\alpha$ of approximately 10° with the filter element, and the linear portion 103 makes an angle $\beta$ of approximately 40° with the filter element. The fairings are made from the same nylon-2 as described with reference to FIG. 1. The other parts of the tube pressure filter are identical to those described above with reference to FIG. 1, and like parts are indicated with like numerals in the two figures.

The operation of the tube pressure filter shown in FIG. 2 is the same as that described above with reference to FIG. 1. The construction and shape of the fairing 2 is such that it enables a very sharp edge to be obtained at the vertex of the fairing, thereby removing any tendency of the filter cake to be held by the fairings instead of discharging; and the use of nylon minimises the tendency of the filter cake to adhere to the lower fairing 2.

I claim:

1. In a tube pressure filter which comprises (a) a pair of generally coaxial inner and outer tubular bodies arranged one within the other and adapted to be supported in a generally upright position, (b) an impermeable elastic sleeve disposed within and secured to the outer tubular body, (c) a filter element disposed around and supported by the inner tubular body, and (b) means for displacing the tubular bodies axially relative to one another between first and second positions; wherein the inner tubular body comprises a central cylindrical section and upper and lower end sections, each of which end sections includes (i) a radially outwardly extending flange portion and (ii) a fairing mounted on or adjacent to said flange portion so as to extend around said central cylindrical section and an end of the filter element, the end sections of the inner tubular body being adapted to co-operate with adjacent portions of the outer tubular body when said tubular bodies are in their first position to define a closed chamber of annular cross-section which is divided into generally co-axial inner and outer non-intercommunicating compartments by the impermeable elastic sleeve, the inner compartment having an inlet for a wet particulate solid material and the outer compartment having an inlet for a hydraulic fluid under pressure; and wherein in the second position of said tubular bodies said chamber is open to enable particulate solid material to be discharged from the inner compartment; the improvement which comprises providing said lower end section of the inner tubular body with a fairing which tapers inwardly towards the central cylindrical section of the inner tubular body in a manner such that the outer surface of the fairing is inclined with respect to the filter element at an angle of less than 45° and forms a sharp edge at the vertex thereof and wherein at least that portion of said fairing which forms said vertex is made from a resilient plastics material having an apparent creep modulus of at least $2.0 \times 10^2$ lbs/in² at 73°F under an initial applied stress of 2,000 lbs/in² and after a test times of 100 hours, a tangent moudulus of elasticity (as measured by the procedure specified in ASTM D 790–66) of at least $1.2 \times 10^2$ lbs/in² and an impact strength (as measured by the 1/2 in. × 1/2 in. notched bar Izod test — ASTM D 256–56) of at least 1.0 ft.lb./in.

2. A tube pressure filter as claimed in claim 1, wherein the fairing of the lower end section is wholly made from a resilient plastics material.

3. A tube pressure filter as claimed in claim 1 wherein said resilient plastics material is a nylon, a glass-filled polyethylene, a glass-filled polypropylene, a poly(acrylonitrile-butadiene-styrene), an impact-resistant polystyrene, a rigid poly(vinyl chloride), or a polyacetal.

4. A tube pressure filter as claimed in claim 1, wherein the fairing of the lower end section has an outer surface of linear profile.

5. A tube pressure filter as claimed in claim 4, wherein the outer surface of the fairing of the lower end section is inclined with respect to the filter element at an angle in the range of from 10° to 45°.

6. A tube pressure filter as claimed in claim 1, wherein the fairing of the lower end section comprises an outer surface of concavely curved profile.

7. A tube pressure filter as claimed in claim 6, wherein the fairing of the lower end section comprises two sections of linear profile connected by a concavely curved section.

8. A tube pressure filter as claimed in claim 7, wherein the angle of inclination with respect to the filter element of the lower linear section of the fairing is in the range of from 30° to 45°, and the angle of inclination with respect to the filter element of the upper linear section is in the range of from 5° to 20°.

9. In a tube pressure filter which comprises (a) a pair of generally coaxial inner and outer tubular bodies arranged one within the other and adapted to be supported in a generally upright position, (b) an impermeable elastic sleeve disposed within and secured to the outer tubular body, (c) a filter element disposed around and supported by the inner tubular body, and (d) means for displacing the tubular bodies axially relative to one another between first and second positions; wherein the inner tubular body comprises a central cylindrical section and upper and lower end sections, each of which end sections includes (i) a radially outwardly extending flange portion and (ii) a fairing associated with said flange portion so as to extend around said central cylindrical section and an end of the filter element, the end sections of the inner tubular body being adapted to co-operate with adjacent portions of the outer tubular body when said tubular bodies are in their first position to define a closed chamber of annular cross-section which is divided into generally coaxial inner and outer non-intercommunicating compartment by the impermeable elastic sleeve, the inner compatment having an inlet for a wet particulate solid material and the outer compartment having an inlet for a hydraulic fluid under pressure; and wherein in the second position of said tubular bodies said chamber is open to enable particulate solid material to be discharged from the inner compartment; the improvemement which comprises providing a fairing for the lower end section of the inner tubular body, which fairing is made from a resilient plastics material and comprises two sections of linear profile connected by a concavely curved section, the angle of inclination with respect to the filter element of the lower linear section of the fairing being in the range of from 30° to 45°, and the angle of inclination with respect to the filter element of the upper linear section being in the range of from 5° to 20°.

* * * * *